US011494780B2

(12) United States Patent
Williamson et al.

(10) Patent No.: US 11,494,780 B2
(45) Date of Patent: *Nov. 8, 2022

(54) METHODS AND SYSTEMS FOR VERIFYING CARDHOLDER AUTHENTICITY WHEN PROVISIONING A TOKEN

(71) Applicant: Mastercard International Incorporated, Purchase, NY (US)

(72) Inventors: Gregory Williamson, Stamford, CT (US); Robert Reany, Stamford, CT (US); Sherri Haymond, Darien, CT (US); Salman Syed, Pelham, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 214 days.

This patent is subject to a terminal disclaimer.

(21) Appl. No.: 16/591,013

(22) Filed: Oct. 2, 2019

(65) Prior Publication Data
US 2020/0051084 A1 Feb. 13, 2020

Related U.S. Application Data

(63) Continuation of application No. 14/472,617, filed on Aug. 29, 2014, now Pat. No. 10,460,322.
(Continued)

(51) Int. Cl.
*G06Q 20/40* (2012.01)
(52) U.S. Cl.
CPC ....... *G06Q 20/405* (2013.01); *G06Q 20/4097* (2013.01)

(58) Field of Classification Search
None
See application file for complete search history.

(56) References Cited

U.S. PATENT DOCUMENTS 7,039,951 B1 5/2006 Chaudhari
7,690,032 B1 3/2010 Peirce
(Continued)

OTHER PUBLICATIONS

Raj Jain, "Tokenization: The Future of Payments Security?", Jul. 22, 2014 (Year: 2014).*

*Primary Examiner* — Jacob C. Coppola
*Assistant Examiner* — Timothy Paul Sax
(74) *Attorney, Agent, or Firm* — Armstrong Teasdale LLP

(57) ABSTRACT

A computer-implemented method for verifying cardholder authenticity when provisioning a token is provided. The method uses an authentication server system having a processor and a memory. The method includes receiving, by the processor, a payment card account identifier provided by a payment requestor. The payment card account identifier for identifying a payment account associated with a cardholder. The method also includes determining a plurality of authentication data associated with the payment requestor, and performing an authentication process using the plurality of authentication data. The authentication process is configured to determine if the payment requestor is the cardholder. The method further includes determining an assurance level associated with the authentication process. The assurance level represents a level of confidence in the authentication process. Moreover, the method includes generating a token for the payment account, and storing the token with the payment card account identifier and the assurance level.

19 Claims, 8 Drawing Sheets

Related U.S. Application Data

(60) Provisional application No. 61/872,425, filed on Aug. 30, 2013.

(56) References Cited

U.S. PATENT DOCUMENTS

| | | |
|---|---|---|
| 7,707,120 B2 | 4/2010 | Dominguez et al. |
| 8,595,490 B2 | 11/2013 | Von Mueller et al. |
| 8,751,381 B2 | 6/2014 | Musser et al. |
| 8,762,279 B2 | 6/2014 | Weller et al. |
| 8,768,837 B2 | 7/2014 | Kranzley |
| 8,769,275 B2 | 7/2014 | Von Mueller et al. |
| 8,769,279 B2 | 7/2014 | Von Mueller et al. |
| 2003/0042301 A1 | 3/2003 | Rajasekaran et al. |
| 2003/0101348 A1* | 5/2003 | Russo ............... G06V 40/1335 713/185 |
| 2003/0154406 A1 | 8/2003 | Honarvar et al. |
| 2004/0030659 A1 | 2/2004 | Gueh |
| 2010/0063895 A1 | 3/2010 | Dominguez et al. |
| 2010/0145860 A1* | 6/2010 | Pelegero ............ G06Q 20/3223 705/44 |
| 2011/0035788 A1 | 2/2011 | White et al. |
| 2012/0060207 A1 | 3/2012 | Mardikar et al. |
| 2012/0173431 A1 | 7/2012 | Ritchie et al. |
| 2013/0036058 A1 | 2/2013 | Kelly et al. |
| 2013/0117138 A1 | 5/2013 | Hazel et al. |
| 2015/0032625 A1* | 1/2015 | Dill ........................ H04L 9/32 705/44 |
| 2015/0046338 A1* | 2/2015 | Laxminarayanan ........................ G06Q 20/38215 705/67 |
| 2015/0046340 A1* | 2/2015 | Dimmick .............. H04L 63/104 705/72 |
| 2015/0229623 A1* | 8/2015 | Grigg ................... G06Q 20/327 726/7 |

* cited by examiner

| Assurance Level Value | Use Case Name | Description of Verification Method |
|---|---|---|
| High | Issuer Verified (Root Verified) | • Issuer verifies cardholder via 3DS or alternative method |
| Medium | Third Party (Merchant) Verified | • Select session data (i.e., device, location, etc.) shared by merchant<br>• Data processed by Network and provided to Issuer<br>• Issuer verifies cardholder based on risk score |
| Low | Card data Verified | • Verification whether card is in good standing ($0 auth) |
| None | No Assurance | • Merchant tokenized without any validation |

FIG. 7

METHODS AND SYSTEMS FOR VERIFYING CARDHOLDER AUTHENTICITY WHEN PROVISIONING A TOKEN

CROSS REFERENCE TO RELATED APPLICATIONS

This application is a continuation of U.S. patent application Ser. No. 14/472,617 filed on Aug. 29, 2014, entitled "METHODS AND SYSTEMS FOR VERIFYING CARDHOLDER AUTHENTICITY WHEN PROVISIONING A TOKEN", which claims the benefit of U.S. Provisional Application No. 61/872,425 filed on Aug. 30, 2013, which are both hereby incorporated by reference in their entirety.

BACKGROUND OF THE DISCLOSURE

This disclosure relates generally to online payment transactions and, more specifically, to systems and methods for verifying the cardholder's authenticity during the processing of online payment transactions and during the provisioning of a token used for online payment transactions.

A significant percentage of payment transactions are now being initiated or performed using account numbers over computing devices. Accordingly, it is becoming increasingly important to be able to verify users of such online devices and protect personally identifiable information associated with the users. To protect account numbers that may be stored by online merchants, tokens may be used in place of the account numbers to prevent compromising those account numbers in case of an account breach. However, during the processing of subsequent payment transactions using the provided tokens, parties involved in the subsequent payment transactions cannot determine what level of cardholder authenticity verification was used when the token was originally provisioned to the merchant.

BRIEF DESCRIPTION OF THE DISCLOSURE

In one aspect, a computer-implemented method for verifying cardholder authenticity when provisioning a token is provided. The method uses an authentication server system having a processor and a memory. The method includes receiving by the processor a payment card account identifier provided by a payment requestor. The payment card account identifier is for identifying a payment account associated with a cardholder. The method also includes determining a plurality of authentication data associated with the payment requestor, and performing an authentication process using the plurality of authentication data. The authentication process is configured to determine if the payment requestor is the cardholder. The method further includes an assurance level associated with the authentication process. The assurance level represents a level of confidence in the authentication process. Moreover, the method includes generating by the processor a token for the payment account, and storing in the memory the token with the payment card account identifier and the assurance level.

In another aspect, an authentication computer device for verifying cardholder authenticity when provisioning a token is provided. The authentication computer device includes one or more processors communicatively coupled to one or more memory devices. The authentication computer device is programmed to receive a payment card account identifier provided by a payment requestor. The payment card account identifier is for identifying a payment account associated with a cardholder. The authentication computer device is also programmed to determine a plurality of authentication data associated with the payment requestor, and perform an authentication process using the plurality of authentication data. The authentication process is configured to determine if the payment requestor is the cardholder. The authentication computer device is further programmed to determine an assurance level associated with the authentication process. The assurance level represents a level of confidence in the authentication process. Moreover, the authentication computer device is programmed to generate a token for the payment account, and store the token with the payment card account identifier and the assurance level.

In yet another aspect, a computer-readable storage medium having computer-executable instructions embodied thereon is provided. When executed by a tokenizing computing device having at least one processor coupled to at least one memory device, the computer-executable instructions cause the processor to receive a payment card account identifier provided by a payment requestor. The payment card account identifier is for identifying a payment account associated with a cardholder. The computer-executable instructions also cause the processor to determine a plurality of authentication data associated with the payment requestor, and perform an authentication process using the plurality of authentication data. The authentication process is configured to determine if the payment requestor is the cardholder. The computer-executable instructions further cause the processor to determine an assurance level associated with the authentication process. The assurance level represents a level of confidence in the authentication process. Moreover, the computer-executable instructions cause the processor to generate a token for the payment account, and store the token with the payment card account identifier and the assurance level.

BRIEF DESCRIPTION OF THE DRAWINGS

FIGS. 1-8 show example embodiments of the methods and systems described herein.

FIG. 1 is a schematic diagram illustrating an example multi-party payment card industry system for enabling payment-by-card transactions in which merchants and card issuers do not necessarily have a one-to-one relationship.

FIG. 2 is a simplified block diagram of an example system used for verifying cardholder authenticity when provisioning a token in accordance with one embodiment of the present disclosure.

FIG. 3 is an expanded block diagram of an example embodiment of a server architecture of the system shown in FIG. 2 including the plurality of computer devices in accordance with one example embodiment of the present disclosure.

FIG. 4 illustrates an example configuration of a client computing device shown in FIGS. 2 and 3.

FIG. 5 illustrates an example configuration of a server system shown in FIGS. 2 and 3.

FIG. 6 is a flow diagram illustrating an example process for generating a token for a consumer's payment account, using the system shown in FIG. 2, such as for the cardholder account shown in FIG. 1.

FIG. 7 is a table of assurance levels associated with identification and validation of subsequent payment transactions associated with the tokenized payment account described in reference to FIG. 6.

FIG. 8 shows an example configuration of a database within a computing device, along with other related computing components, that may be used as part of the system shown in FIG. 2 to verify cardholder authenticity during online payment transactions.

DETAILED DESCRIPTION OF THE DISCLOSURE

Figure 1:
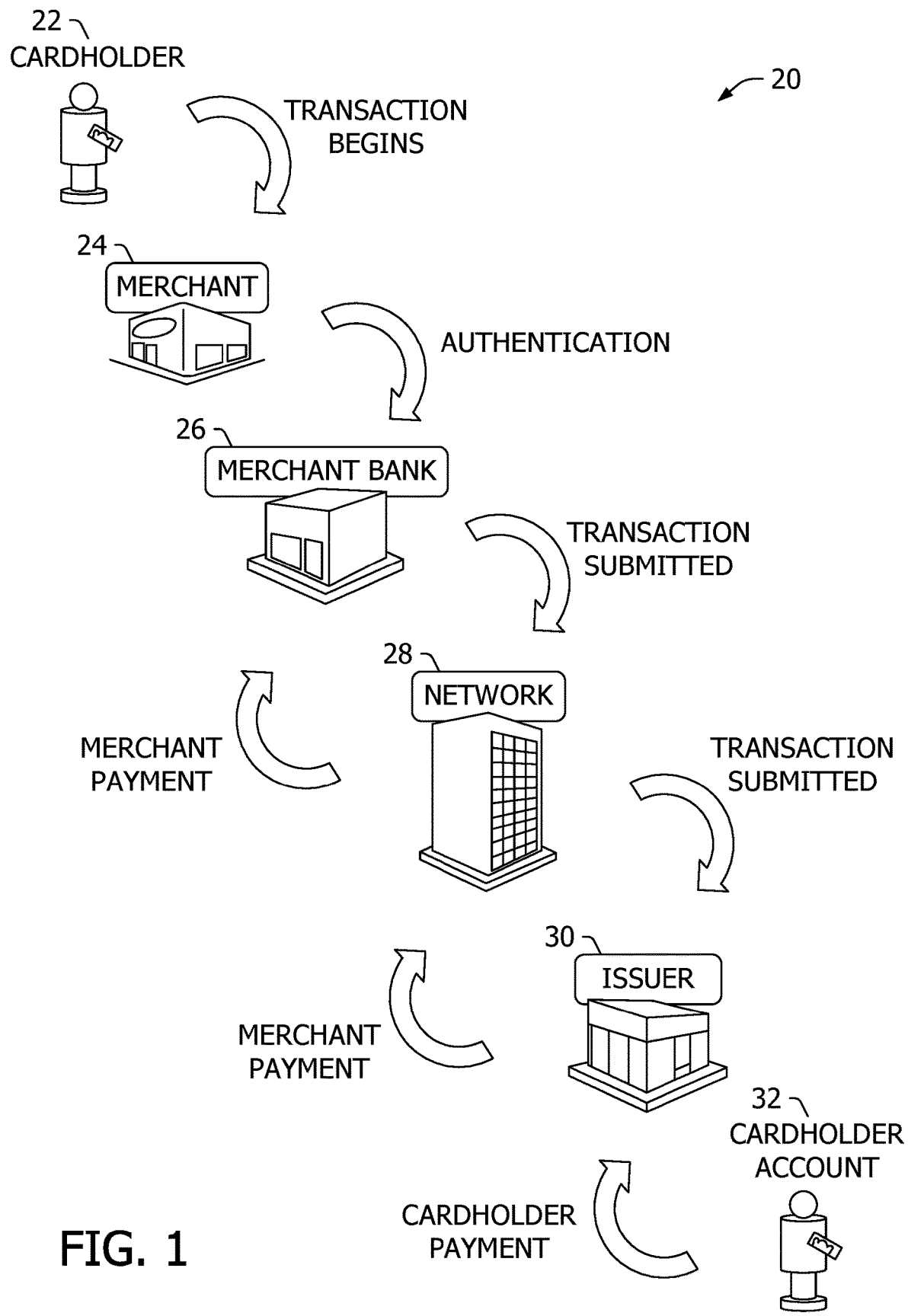

Systems and methods are described herein for implementing a tokenization system that provides requestors with a token to be used in place of a payment card account number. A token represents a payment card account number, in some embodiments, the token is formatted the same as a payment card account number, in other embodiments, the token is a hexadecimal string or other encoded identifier that will be linked to the payment card account number. As part of tokenization, it is desirable that Identification and Verification (sometimes referred to as "ID&V" or "IDV") occur to ensure that the person requesting the token (i.e., the consumer or the payment requestor) is the authorized user of the card. To do so, it is desirable to have the ability to capture the right data and flag the right message types when the token is issued. The data may be provided from the token requestor via an API or through existing interfaces such as 3-D Secure (3DS). Further, it is desirable to track and communicate, at each subsequent transaction, the identity and verification process that occurred when the token was provisioned. It is also desirable to communicate, in the authorization message, additional data about the transaction and the token to help mitigate risk.

As used herein, the term "token" refers generally and broadly to a security identifier and, more specifically, to a security identifier that serves as a replacement for a plaintext primary account number (PAN) of a consumer's payment account. As such, the terms "tokenization" and "provisioning a token", as used herein, refers generally and broadly to the process for creating a token that will serve to represent the consumer's payment account.

Embodiments of the present disclosure provide systems and methods for verifying cardholder authenticity during online payment transactions. The methods and systems described herein facilitate tokenization of a consumer's payment account information, specifically a consumer's primary account number (PAN). The systems and methods include an identification and verification (IDV) computer system that is programmed to perform the steps described herein. In one embodiment, a payment requestor (i.e., an unverified user attempting to use the PAN) initiates a payment with a merchant using a payment account. The payment requestor enters a PAN into a payment application. This payment requestor should be (but may not be) the actual owner of the payment account. The systems and methods described herein are directed toward establishing a confidence level as to whether the payment requestor is actually the actual cardholder (i.e., an authorized user of the payment account).

Authentication data, such as device-specific and merchant-specific information, is sent to a token provider, such as, for example, a payment network, such as MasterCard® network. The token provider uses this data to generate a confidence score that estimates the payment requestor's authenticity (i.e., that the request is actually originating from the user associated with the payment account). This confidence score and/or the underlying confidence data is passed along to an issuer, which makes a threshold decision whether or not to proceed with tokenization. If the issuer decides to proceed, a token is then generated for the payment account, and the consumer receives an activation message. Some of the parties, such as the token provider, the merchant, and/or the issuer, retain the scoring data associated with the token for subsequent use.

During subsequent payment transactions involving the payment account and the merchant (i.e., involving the token), the various parties to the transaction (i.e., the merchant, the payment network, and/or the issuer) may leverage the confidence score and/or the underlying data generated during the authorization of the token. For example, an issuer may be presented with a payment authorization request involving the token, such as during an attempted purchase between the consumer and the merchant. The confidence data collected during authorization of the token may be used as confidence data for a transaction involving the token. In other words, however confident the issuer was about giving out the token can be used as additional information when valuing the confidence of a particular transaction.

The methods and systems described herein may be implemented using computer programming or engineering techniques including computer software, firmware, hardware, or any combination or subset. As disclosed above, at least one technical problem with prior payment card systems is determining the level of verification that occurred when a token was provisioned. The systems and methods described herein address that technical problem. The technical effect of the systems and processes described herein is achieved by performing at least one of the following steps: (a) receiving, by a processor, a payment card account identifier provided by a payment requestor, the payment card account identifier for a payment account associated with a cardholder; (b) determining a plurality of authentication data required by an issuer associated with the payment account; (c) requesting the plurality of authentication data; (d) receiving the plurality of authentication data; (e) performing an authentication process using the plurality of authentication data, the authentication process is configured to determine if the payment requestor is the cardholder; (f) calculating, by the processor, a confidence score using at least the plurality of authentication data, the confidence score representing a level of confidence that the payment requestor is the cardholder; (g) transmitting the confidence score to an issuer associated with the payment account; (h) receiving an accountholder authentication value generated by the issuer computing device; (i) transmit an authentication request to the payment requestor based on the confidence score; (j) receive an authentication response originating from the payment requestor; (k) validate the received authentication response; (l) determining the assurance level based in part on the authentication process, where the assurance level represents a level of confidence is the authentication process; (m) generating, by the processor, a token for the payment account; and (n) storing, in the memory, the token with the payment card account identifier and the assurance level.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction. As used herein, the term "payment account" is used generally to refer to the underlying account with the transaction card. In addition, consumer card account behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the disclosure by way of example and not by way of limitation. It is contemplated that the disclosure has general application to processing financial transaction data by a third party in industrial, commercial, and residential applications.

FIG. 1 is a schematic diagram illustrating an example multi-party transaction card industry system 20 for enabling payment-by-card transactions in which merchants 24 and card issuers 30 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 22 purchases travel, such as airfare, a hotel stay, and/or a rental car, at least partial itinerary information is transmitted during the clearance process as transaction data. When interchange network 28 receives the itinerary information, interchange network 28 routes the itinerary information to database 120.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 2:
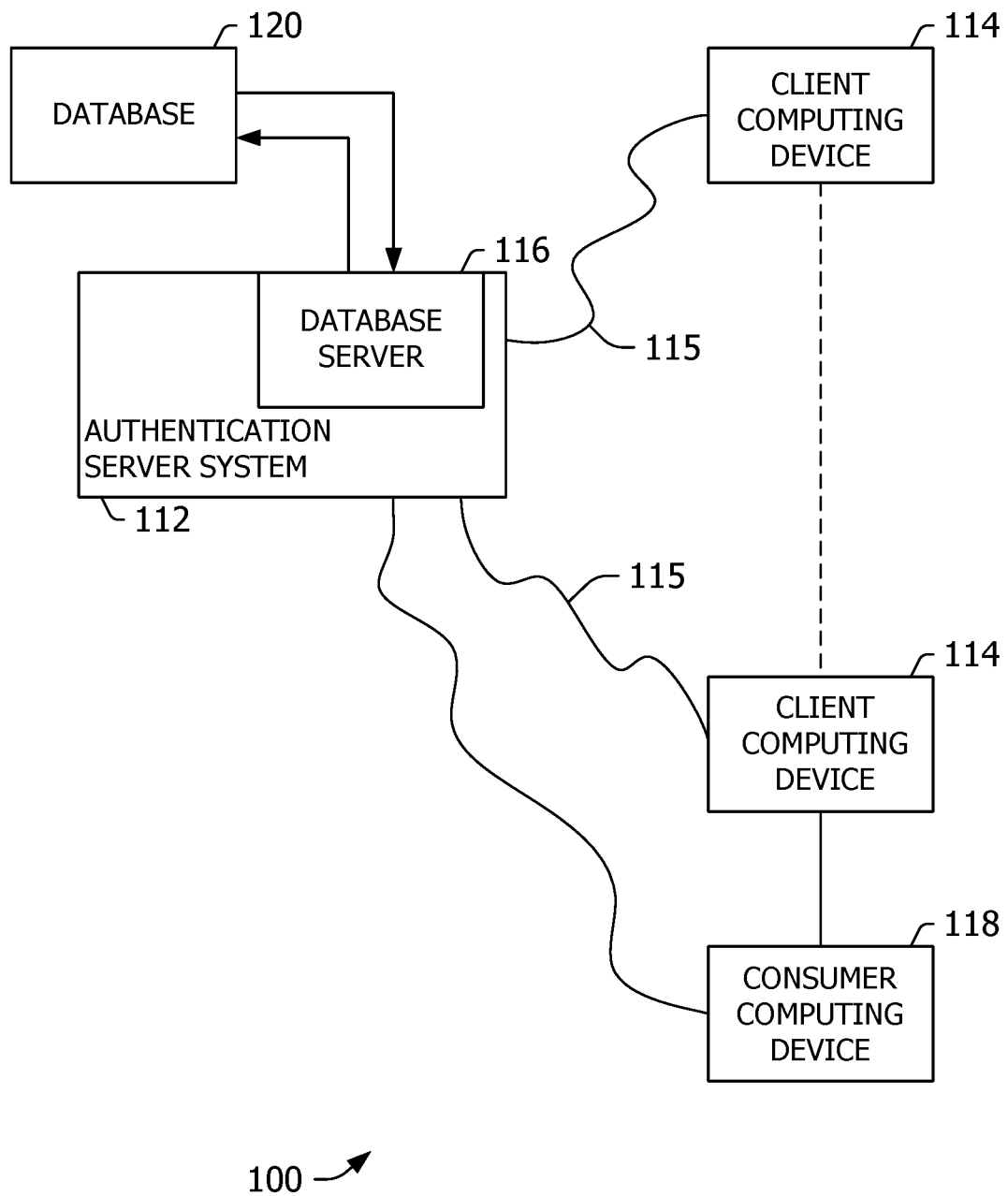

FIG. 2 is a simplified block diagram of an example system 100 used for verifying cardholder authenticity when provisioning a token in accordance with one embodiment of the present disclosure. In the example embodiment, system 100 may be used for performing payment-by-card transactions received as part of processing cardholder transactions.

More specifically, in the example embodiment, system 100 includes an authentication server system 112, a plurality of client sub-systems, also referred to as client computing devices 114 connected to authentication server system 112, and one or more consumer computing devices 118 in communication with client computing devices 114. In one embodiment, client computing devices 114 are computers including a web browser, such that authentication server system 112 is accessible to client computing devices 114 using the Internet. Client computing devices 114 and consumer computing device 118 are interconnected to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client computing devices 114 could be any device capable of interconnecting to the Internet including, but not limited to, a desktop computer, a laptop computer, a personal digital assistant (PDA), a cellular phone, a smartphone, a tablet, a phablet, or other web-based connectable equipment.

Authentication server system is a computing device and may also be called the authentication computer device. In some embodiments, authentication server system 112 may be associated with, or is part of the payment system, or in communication with the payment card system payment network 20, shown in FIG. 1. In other embodiments, authentication server system 112 is associated with a third party and is merely in communication with the payment network 20. In some embodiments, authentication server system 112 may be associated with, or be part of acquiring bank 26, interchange network 28, and issuer bank 30, all shown in FIG. 1.

A database server 116 is connected to database 120, which contains information on a variety of matters, as described below in greater detail. In one embodiment, centralized database 120 is stored on authentication server system 112 and can be accessed by potential users at one of client computing devices 114 by logging onto authentication server system 112 through one of client computing devices 114. In another embodiment, database 120 can be accessed by consumers at consumer computing device 118 by logging onto authentication server system 112 through one of client computing devices 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, one of client computing devices 114 may be associated with acquirer bank 26 (shown in FIG. 1), while another one of client computing devices 114 may be associated with issuer bank 30 (shown in FIG. 1), and another client computing device 114 may be associated with a participating merchant 24 (shown in FIG. 1). Consumer computing device 118 may be a computer system and/or mobile system used by a cardholder 20 (shown in FIG. 1) or may be a computer system and/or mobile system used by a consumer purporting to be cardholder 22. In the example embodiment, authentication server system 112 is associated with a network interchange, such as interchange network 28, and may also be referred to as an interchange computer system. Authentication server system 112 may be used for processing transaction data. In addition, client computing devices 114 and/or consumer computing device 118 includes a computer system associated with at least one of an online bank, a bill payment outsourcer, an acquirer bank, an acquirer processor, an issuer bank associated with a transaction card, an issuer processor, a remote payment system, a token requestor, a payment requestor (i.e., a consumer attempting to make a purchase), a token provider, and/or a biller.

Figure 3:
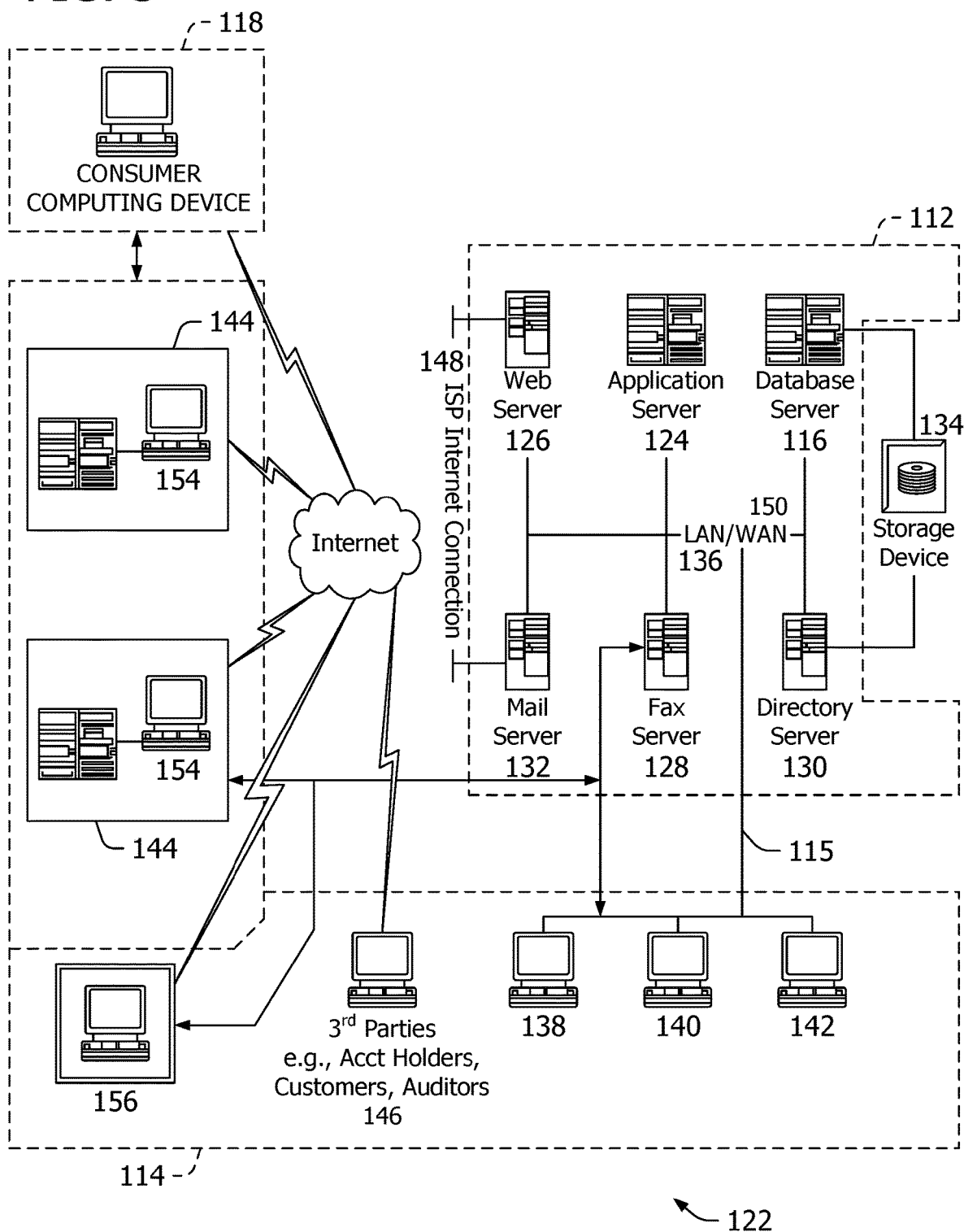

FIG. 3 is an expanded block diagram of an example embodiment of a server architecture of system 100 shown in FIG. 2 including other computer devices in accordance with one embodiment of the present disclosure. Components in system 122, identical to components of system 100 (shown in FIG. 2), are identified in FIG. 3 using the same reference numerals as used in FIG. 2. System 122 includes authentication server system 112, client computing devices 114, and consumer computing device 118. Authentication server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Authentication server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client computing devices includes a manager workstation 156 located at a remote location. Workstations 154 and 156 are personal computers having a web browser. Also, workstations 154 and 156 are configured to communicate with authentication server system 112. Furthermore, fax server 128 communicates with remotely located client computing devices, including a client computing device 156 using a telephone link. Fax server 128 is configured to communicate with other client computing devices 138, 140, and 142 as well.

Figure 4:
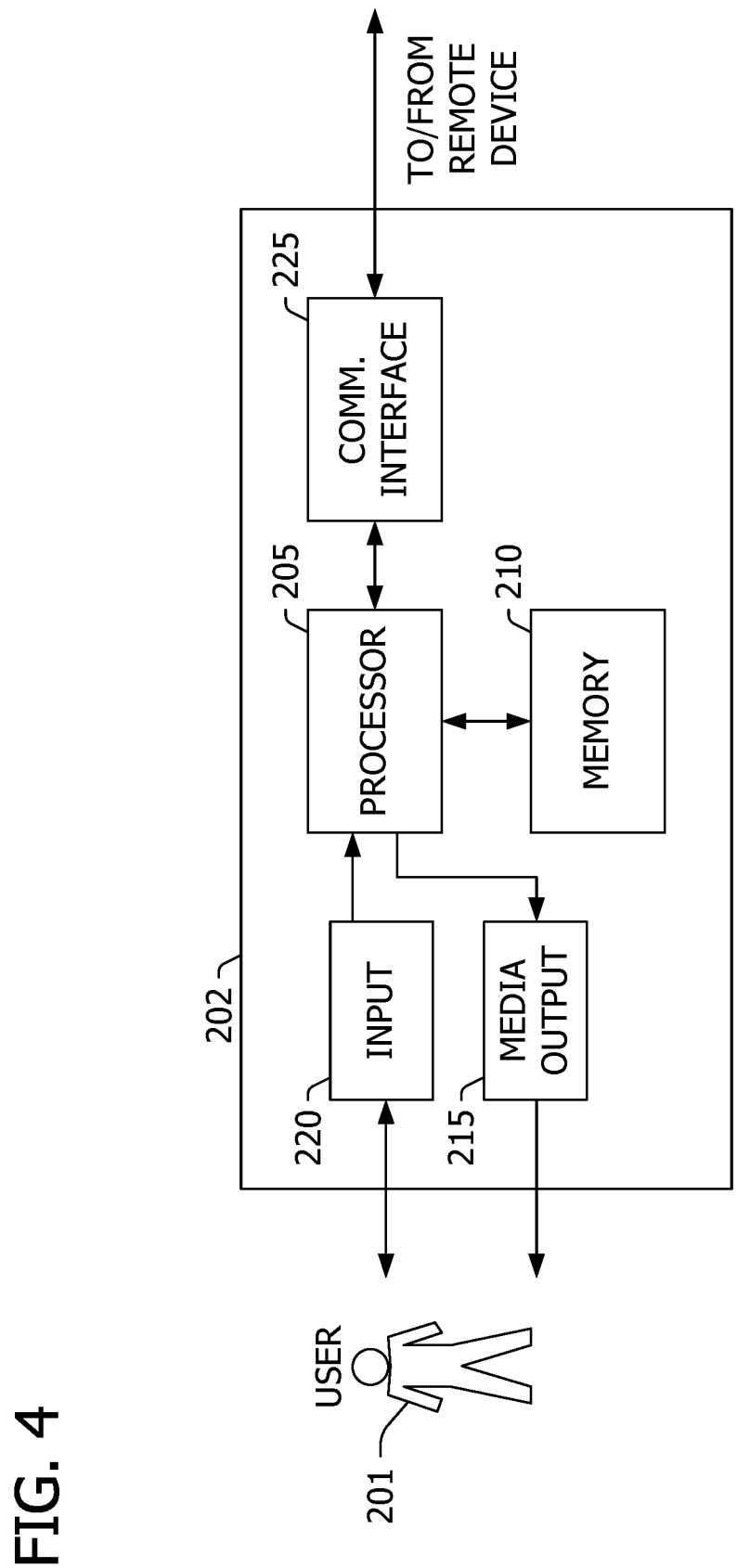

FIG. 4 illustrates an example configuration of a user system 202 operated by a user 201, such as cardholder 22 (shown in FIG. 1). User system 202 may include, but is not limited to, client computing devices 114, 138, 140, and 142, consumer computing device 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter (not shown) such as a video adapter and/or an audio adapter. An output adapter is operatively coupled to processor 205 and operatively couplable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as authentication server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from authentication server system 112. A client application allows user 201 to interact with a server application from authentication server system 112. For example, instructions may be stored by a cloud service, and the output of the execution of the instructions sent to the media output component 215.

Figure 5:
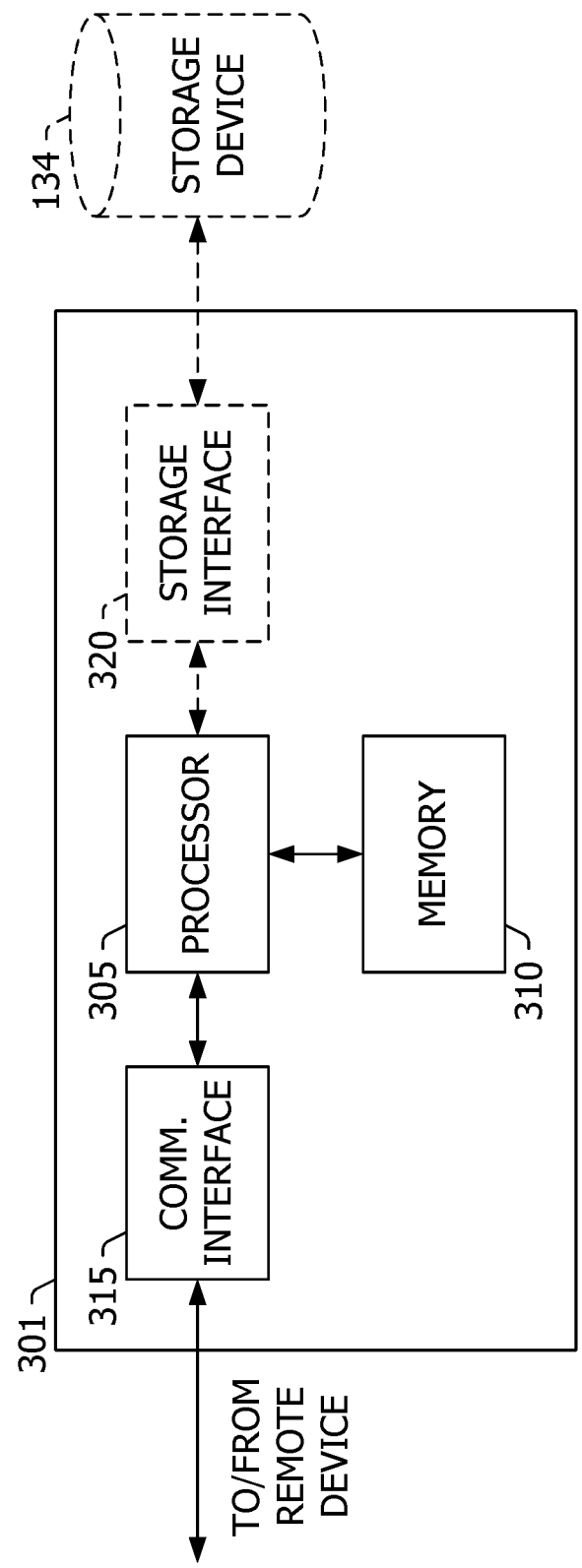

FIG. 5 illustrates an example configuration of a server system 301 such as authentication server system 112 (shown in FIGS. 2 and 3). Server system 301 may include, but is not limited to, database server 116, transaction server 124, web server 126, fax server 128, directory server 130, mail server 132, and any other computing device specially programmed to perform the authentication processes described herein along with the token provisioning processes described herein.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types of memory usable for storage of a computer program.

Processor 305 executes computer-executable instructions for implementing aspects of the disclosure. In some embodiments, the processor 305 is transformed into a special purpose microprocessor by executing computer-executable instructions or by otherwise being programmed. For example, the processor 305 is programmed with the instruction such as illustrated in FIG. 6.

Figure 6:
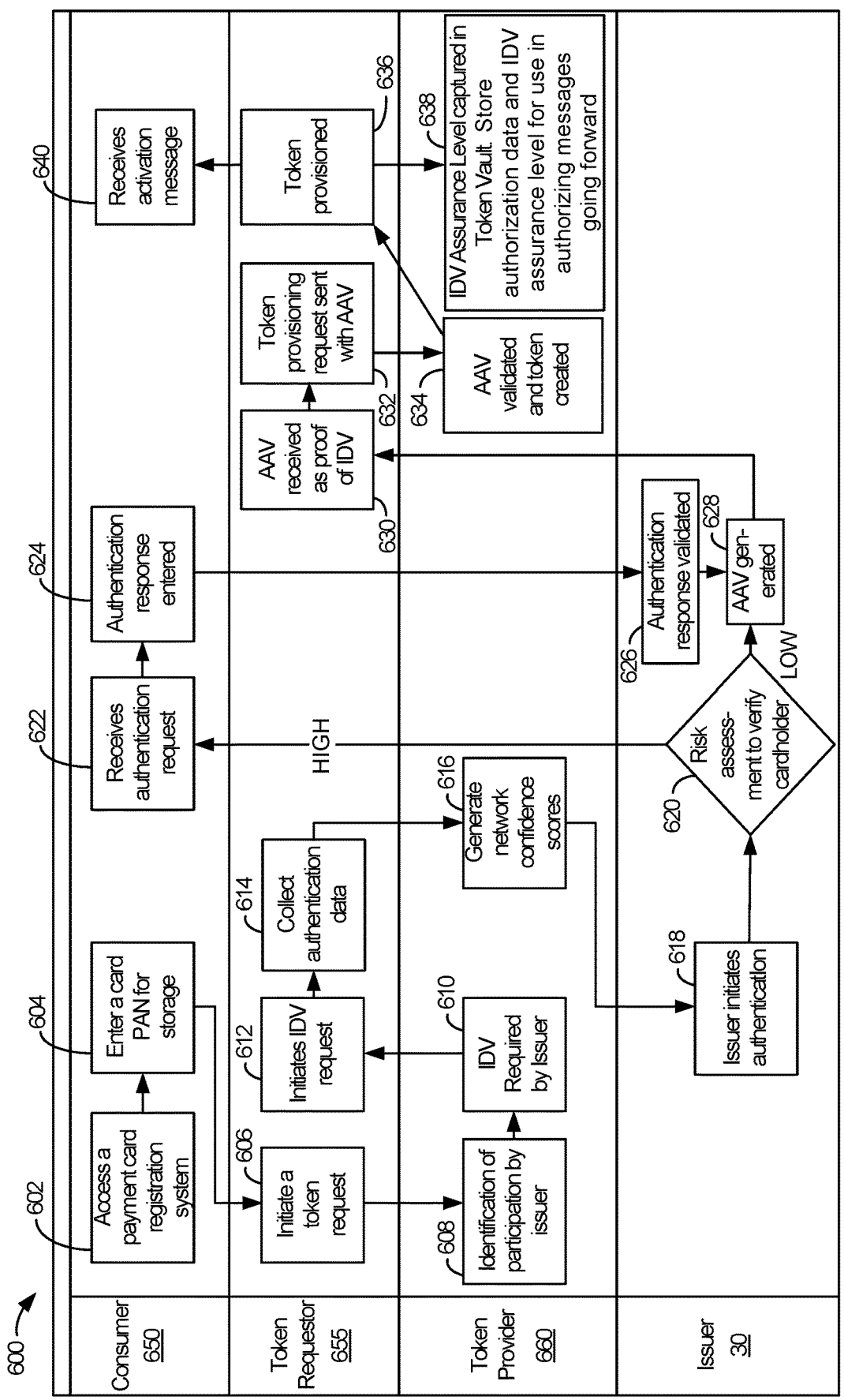

FIG. 6 is a flow diagram illustrating an example process 600 for generating a token for a consumer's payment account, using system 100 shown in FIG. 2, such as cardholder account 32 (shown in FIG. 1). In the example embodiment, part of process 600 is determining if a consumer 650 is cardholder 22 as shown in FIG. 1. The process is implemented using system 100 (shown in FIG. 2). In the example embodiment, provisioning a token involves consumer 650 (also known as a payment requestor) using consumer computing device 118 (shown in FIG. 2), a token requestor 655 using client computing device 114 (shown in FIG. 2), a token provider 660 using authentication server system (shown in FIG. 2), and issuer 30 (shown in FIG. 1) using client computing device 114. In some embodiments, token requestor 655 is merchant 24 (shown in FIG. 1) and/or an online merchant, and token provider 660 is interchange network 28 or payment network 20 (both shown in FIG. 1).

In other embodiments, token requestor 655 is not merchant 24 but is in communication with merchant 24. In still other embodiments, token providers 660 is a third-party token provider and not directly associated with interchange network 28 (shown in FIG. 1). Each party to the tokenization process utilizes one or more computing devices such as, for example, server system 112 (shown in FIG. 2), client computing device 114 (shown in FIG. 2), consumer computing device 118 (shown in FIG. 2), user system 202 (shown in FIG. 3), and/or server system 301 (shown in FIG. 4), to perform at least some of the operations described herein.

In the example embodiment, consumer 650 registers a payment card with token requestor 655 to store for use in future transactions. To register the payment card with token requestor 655, consumer 650 enters payment card information, such as payment card account number and expiration date, as if consumer 650 was initiating a payment transaction. Token requestor 655 requests authentication of consumer 650. If consumer 650 is authenticated, then token requestor 655 receives a token to store instead of consumer's payment card account number. And token requestor 665 uses the token instead of the consumer's payment card account number in processing future transactions for consumer 650. In some embodiments, consumer 650 already has a merchant account with token requestor 655 and is adding a new payment card to the account. In other embodiments, consumer 650 is opening a new merchant account with token requestor 655.

In the example embodiment, consumer 650 accesses 602 a registration system on a website associated with token requestor 655 using consumer computing device 118. In the example embodiment, token requestor 655 is an online merchant. Consumer 650 enters 604 a primary account number (PAN) associated with cardholder account 32 into the registration system for merchant 24 to store for future purchases. Token requestor 655 initiates 606 a token request to token provider 660. Token provider 660 identifies 608 if issuer 30 of cardholder account 32 participates in tokenization and, if so, determines 610 what type of identification and verification (IDV) request is required by issuer 30. Token requestor 655 initiates 612 the IDV request and collects 614 the authentication data for use with the IDV request.

In the example embodiment, authentication data includes one or more of: (1) consumer device attributes such as, for example, device attribute data (i.e., data derived from the device consumer 650 is transacting from, which can ultimately be used for creating a device fingerprint, and which may include IP address, physical address associated with IP address, device type, and phone number), and geo-location data (i.e., data from the device of consumer 650, indicating the assessed location of the device, such as GPS location, country, city, etc.); (2) data from token requestor 655 such as, for example, consumer contact information (personally identifiable information (PII) about cardholder 22 associated with payment account 32 that the token is being requested for, which will be used to determine the likelihood that token requestor 655 has the correct cardholder, and which may include email address, mobile phone number, landline phone number, confirmed shipping address, consumer IDV (e.g., anonymous, unverified, externally scored (e.g., credit reference agency), authentic issued official ID (e.g., passport, driver's license)), and age of customer relationship), and token requestor reference data such as, for example, token requestor risk score (i.e., a risk score derived from the token requestor's risk systems and reference data), days account has been on file with token requestor 655, days since cardholder 22 last used the card on file, verification method of cardholder 22 performed by token requestor 655 at token request, and purchases information (i.e., type of goods/services provided—digital only, low value, high value with verified address, in-store); and (3) network reference data such as, for example, network level risk scores (i.e., risk scores calculated by interchange network 28 based on the authentication data).

In the example embodiment, authentication data is collected 614 by token requestor 655 and passed to token provider 660. Token provider 660 evaluates the authentication data and generates 616 one or more network confidence scores that represent a level of confidence as to whether consumer 650 is truly the authorized cardholder 22. These confidence scores are passed to issuer 30 that, in the example embodiment, either allows or denies the token creation process to proceed. This test may be a threshold test based at least upon the confidence score, and may involve other data or logic known to issuer 30. In the example embodiment, after issuer 30 initiates 618 token creation, issuer 30 determines 620 whether to initiate an additional authentication and response query with consumer 650, such as a separate authentication email and response. In the example embodiment, issuer 30 initiates this process when risk is "high" (i.e., confidence level is low), and skips this process when the risk is "low" (i.e., confidence level is high) and proceeds directly to step 628.

In the example embodiment, consumer 650 receives 622 an authentication request from issuer 30. This authentication request uses a preexisting method of communication that was previously set-up between cardholder 22 associated with cardholder account 32 and issuer 30. In some embodiment, the authentication request may be an email or a text message (SMS message) transmitted to consumer 650 with a link to click on to continue registration. In other embodiments, the authentication request may include a request for biometric data, an answer to a security question, a temporary password, a one-time code, or other data to confirm that consumer 650 is cardholder 22 associated with cardholder account 32. Once the authentication response is entered 624 and transmitted to issuer 30, issuer 30 validates 626 the authentication response.

Issuer 30 generates 628 an accountholder authentication value (AAV) and sends the AAV to token requestor 655 as proof of IDV. The AAV is a security code that connects cardholder's personally identity information to the token provisioning process. When token requestor 655 receives 630 the AAV, token requestor 655 generates and transmits 632 a token provisioning request to token provider 660. The token provisioning request includes the AAV. Token provider 660 validates 634 the AAV and creates a token, which token provider 660 transmits to token requestor 655. Token requestor 655 provisions 636 the token by capturing the authentication data collected during process 600 including the IDV assurance level at which the token is provisioned. Consumer 650 then receives 640 an activation message. Token requestor 655 stores the token with the consumer's account at the online merchant. Token provider 660 stores the token and the PAN associated with the token. Further, in the example embodiment, the authentication data is captured by token provider 660 and stored 638 in a "Token Vault" (i.e., a database repository, for example database 120 shown in FIG. 2) for use by subsequent payment transaction authorizations, as described in greater detail below in reference to FIG. 7.

In the example embodiment, in future transactions between consumer 650 and merchant 24, merchant 24 transmits an authorization request message to merchant bank 26, which passes the authorization request to interchange network 28. The authorization request message includes a token in the place of a payment card account number. Merchant bank 26 or interchange network 28 uses the token to query the "Token Vault" to retrieve the PAN associated with the token and the IDV assurance level captured when the token was provisioned. In the example embodiment, interchange network 28 uses the IDV assurance level to calculate one or more confidence scores for the transaction. In other embodiments, the interchange network 28 transmits the IDV assurance level to issuer 30 with the authorization request and issuer uses the IDV assurance level to calculate one or more confidence scores for the transaction.

In the example embodiment, in performing process 600, consumer 650 may use consumer computing device 118; token requestor 655 may use one of client devices 114; token provider 660 may use authentication server system 112; and issuer 30 may use one of client computing devices 114.

FIG. 7 is a table 700 of assurance levels associated with identification and validation of subsequent payment transactions associated with the tokenized payment account described in reference to FIG. 6. In the example embodiment, and as described above, subsequent (i.e., future) payment transactions involving the provisioned token may be subject to authentication scrutiny using at least at least the authentication data and/or confidence score collected during the tokenization process. An IDV assurance field indicates the assurance level of the initial identification and verification that occurred when the token was issued (i.e., the confidence value). FIG. 7 contains an example set of values for this field.

Table 700 illustrates four levels of assurance, "high," "medium," "low," and "none." A payment transaction is categorized based on how authentication occurred. In the example embodiment, the "high" assurance level is associated with an issuer-verified scenario in which, for example, the issuer verified the cardholder via, for example, 3D-Secure (3DS) or alternative method. This type of verification is also known as root verification. The "medium" assurance level is associated with network-managed risk-based provisioning, such as third party verification, also known as merchant verification. For example, in some embodiments, authentication data may not go directly to the issuer, but some data is still captured and scored. A third party, which may be a merchant 24 (shown in FIG. 1), may have a relationship with the consumer, perhaps a long-standing relationship, and feels confident about the token. Third-party verification may validate consumers via hardware or software analysis methods, or via single sign-on. The "low" assurance level is associated with network-managed card validation. This level represents a more rudimentary verification that does not necessarily validate any data about the cardholder. For example, a zero-dollar verification may be used to validate that the card is actually active in good standing. The "none" assurance level is associated with no level of authentication having been performed.

Further, in the example embodiment, a token assurance level is used to identify the specific type of verification that occurred when accessing the token, the risk score associated with attributes of the IDV assurance level and the subsequent transactions, and the key data attributes collected by token requestor 655 (shown in FIG. 6). Risk score identifies the risks associated with authenticating consumer 650 based on aspects of the authentication process such as, for example, (1) device and User Reputation (i.e., identifying the risk associated with the device, the token storage method (i.e. Secure Element, Cloud, etc.), the PAN, the email, the phone and other attribute of the transaction, which data is received from the device the token is accessed from and passed in the authorization message); (2) where the user is (i.e., value to identify the location of the device is in line with what is expected of the known cardholder, which data is derived based on the capability of the device accessing the token); (3) associations (i.e., a value to identify the likelihood this is the user based on other associations they have when accessing the token such as logins, federated identity's, or social networks); and (4) how the user behaves (i.e., a value indicating of the actions taken when accessing the device are in line with users normal behavior). Another aspect is the manner in which the token will be used by the token holding merchant in subsequent transactions. This "token access method" indicates the level of explicit verification of the cardholder that occurred when accessing the token (e.g., static pin, physical biometric, out of band OTP, etc.)

During operation, in the example embodiment, whenever a transaction associated with the token is sent to payment network 20 (shown in FIG. 1), the assurance level is computed and/or retrieved for use during transaction authorization. The assurance level may be transmitted to issuer 30 for their consideration, to identify risk and/or value of the transaction. More specifically, in some embodiments, consumer device-specific data and geo-location data is transmitted to an authorization network. Risk scores and token access method (i.e., token assurance level) are shared with merchant 24, acquirer 26, interchange network 28, and issuer 30 (all shown in FIG. 1). Further, the IDV assurance field is shared between the token vault and the issuer.

Figure 8:
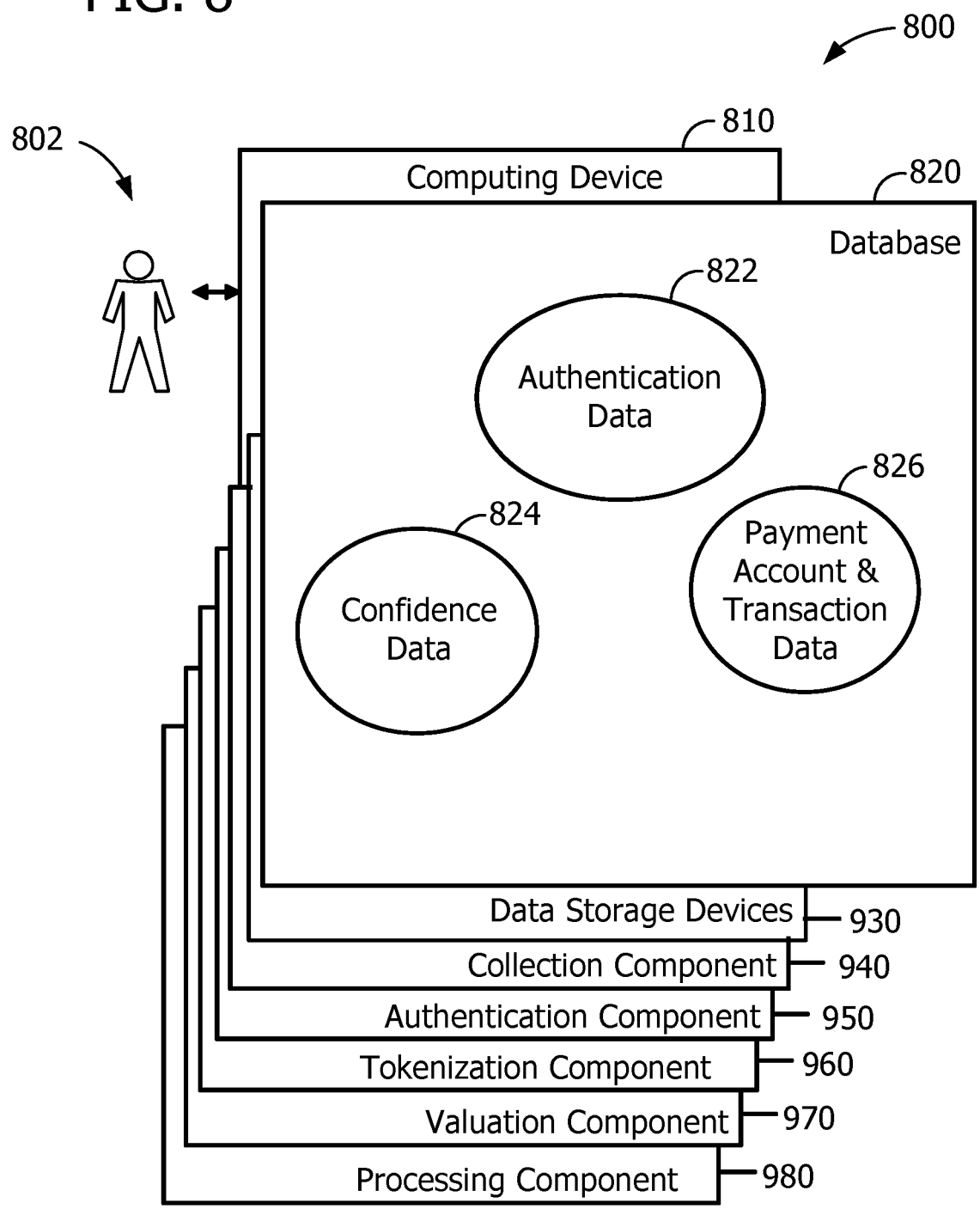

FIG. 8 shows an example configuration 800 of a database 820 within a computing device 810, along with other related computing components, that may be used as part of system 100 shown in FIG. 2 to verify cardholder authenticity during online payment transactions. In some embodiments, computing device 810 is similar to authentication server system 112 (shown in FIG. 2) and/or server system 301 (shown in FIG. 5). Database 820 is coupled to several separate components within computing device 810, which perform specific tasks.

In the example embodiment, database 820 includes authentication data 822, confidence data 824, and payment account and transaction data 826. In some embodiments, database 820 is similar to database 120 (shown in FIG. 2). Authentication data 822 includes information associated with authenticating a payment account from a payment requestor during tokenization, such as described in reference to FIG. 6. Confidence data 824 includes confidence values generated by the systems and methods described herein in reference to FIG. 6. Payment account and transaction data 826 includes data associated with online payment transactions such as discussed in reference to FIGS. 6 & 7.

Computing device 810 includes the database 820, as well as data storage devices 830. Computing device 810 also includes a collection component 840 for identifying and/or collecting authentication data 822, as described in reference to FIG. 6. Computing device 810 also includes an authentication component 850 for generating confidence scores. A tokenization component 860 is also included for processing token requests. A valuation component 870 is also included for analyzing and processing assurance values associated with payment transactions associated with tokens. A processing component 880 assists with execution of computer-executable instructions associated with the tokenization system.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for verifying cardholder authenticity when provisioning tokens, said method using an authentication server system having a processor and a memory, said method comprising steps performed by the processor including:
receiving, from a plurality of token requestors, a plurality of token requests, each token request including a payment card account identifier provided by a payment requestor to the respective token requestor, the payment card account identifier identifying a payment card account associated with a cardholder;
determining, for each token request, one of a plurality of types of identification and verification (IDV) required by a respective issuer of the payment card account in association with the provisioning of the tokens, wherein the plurality of IDV types include a third-party validation and a network validation, wherein the third-party validation is associated with an assurance level that is a medium value level, and wherein the network validation is associated with the assurance level that is a low value level;
obtaining, for each token request, an accountholder authentication value (AAV) from the respective issuer, comprising:
in response to determining that the required type of IDV for a first of the token requests is the third-party-validation, (a) instructing the respective token requestor to initiate an IDV request, (b) receiving, from the respective token requestor in response to the IDV request, a plurality of authentication data, (c) calculating a network confidence score based on the authentication data, (d) transmitting the network confidence score to the respective issuer, and (e) receiving the AAV for the first token request from the respective issuer in response to the network confidence score; and
in response to determining that the required type of IDV for a second of the token requests is the network validation, receiving, from the respective issuer, the AAV for the second token request from the respective issuer in response to validating that the respective payment card account is active and in good standing;
generating, for each token request, a token for the respective payment card account based on the received AAV for the respective token request;
associating, in the memory with each generated token, the corresponding payment card account identifier and the corresponding assurance level associated with the corresponding type of IDV;
in response to receiving, from a first merchant, a first authorization request including a first token generated in response to the first token request, retrieving, by the processor from the memory, the respective assurance level associated with the respective type of IDV and the respective payment card account identifier associated with the first token;
in response to receiving, from a second merchant, a second authorization request including a second token generated in response to the second token request, retrieving, by the processor from the memory, the respective assurance level associated with the respective type of IDV and the respective payment card account identifier associated with second token; and
transmitting, in response to the first and second authorization requests, the retrieved assurance levels associated with the corresponding types of IDV to the respective issuer, wherein the assurance level for the first token indicates a relatively higher assurance, as compared to the assurance level for the second token, that the first token was issued to a legitimate holder of the respective payment card account.

2. The method of claim 1, wherein the plurality of authentication data includes a high value level and the medium value level.

3. The method of claim 2, wherein the high value level indicates that the respective issuer authenticated the cardholder during the provisioning of the generated token, wherein the medium value level indicates that a third party authenticated the cardholder during the provisioning of the generated token, and wherein the third party excludes the respective issuer.

4. The method of claim 2, wherein the network confidence score enables the respective issuer to perform a threshold test to determine whether to allow the provisioning of the generated token.

5. The method of claim 1, wherein the plurality of authentication data includes the low value level and a none value level.

6. The method of claim 5, wherein the low value level indicates that the payment card account was in good standing during the provisioning of the generated token, and wherein the none value level indicates that no level of authentication was performed on the payment card account and the cardholder during the provisioning of the generated token.

7. The method of claim 1 further comprising:
determining, by the processor and based on the AAV, that the payment requestor was authenticated through a separate authentication process initiated by the respective issuer.

8. The method of claim 7, wherein generating the token for the respective payment card account based on the received AAV for the respective token request further comprises generating the token based on the determination that the payment requestor was authenticated through the separate authentication process initiated by the respective issuer.

9. An authentication computer device for verifying cardholder authenticity when provisioning tokens, said authentication computer device comprising one or more processors communicatively coupled to one or more memory devices, said one or more processors configured to:
receive, from a plurality of token requestors, a plurality of token requests, each token request including a payment card account identifier provided by a payment requestor to the respective token requestor, the payment card account identifier identifying a payment card account associated with a cardholder;
determine, for each token request, one of a plurality of types of identification and verification (IDV) required by a respective issuer of the payment card account in association with the provisioning of the tokens, wherein the plurality of IDV types include a third-party validation and a network validation, wherein the third-party validation is associated with an assurance level that is a medium value level, and wherein the network validation is associated with the assurance level that is a low value level;

obtain, for each token request, an accountholder authentication value (AAV) from the respective issuer, comprising:

in response to determining that the required type of IDV for a first of the token requests is the third-party validation, (a) instructing the respective token requestor to initiate an IDV request, (b) receiving, from the respective token requestor in response to the IDV request, a plurality of authentication data, (c) calculating a network confidence score based on the authentication data, (d) transmitting the network confidence score to the respective issuer, and (e) receiving the AAV for the first token request from the respective issuer in response to the network confidence score; and in response to determining that the required type of IDV for a second of the token requests is the network validation, receiving, from the respective issuer, the AAV for the second token request from the respective issuer in response to validating that the respective payment card account is active and in good standing;

generate, for each token request, a token for the respective payment card account based on the received AAV for the respective token request;

associate, in the one or more memory devices with each generated token, the corresponding payment card account identifier and the corresponding assurance level associated with the corresponding type of IDV;

in response to receiving, from a first merchant, a first authorization request including a first token generated in response to the first token request, retrieve, from the one or more memory devices, the respective assurance level associated with the respective type of IDV and the respective payment card account identifier associated with the first token;

in response to receiving, from a second merchant, a second authorization request including a second token generated in response to the second token request, retrieve, from the one or more memory devices, the respective assurance level associated with the respective type of IDV and the respective payment card account identifier associated with second token; and transmit, in response to the first and second authorization requests, the retrieved assurance levels associated with the corresponding types of IDV to the respective issuer, wherein the assurance level for the first token indicates a relatively higher assurance, as compared to the assurance level for the second token, that the first token was issued to a legitimate holder of the respective payment card account.

10. The authentication computer device of claim 9, wherein the plurality of authentication data includes a high value level and the medium value level.

11. The authentication computer device of claim 10, wherein the high value level indicates that the respective issuer authenticated the cardholder during the provisioning of the generated token, wherein the medium value level indicates that a third party authenticated the cardholder during the provisioning of the generated token, and wherein the third party excludes the respective issuer.

12. The authentication computer device of claim 9, wherein the plurality of authentication data includes the low value level and a none value level.

13. The authentication computer device of claim 12, wherein the low value level indicates that the payment card account was in good standing during the provisioning of the generated token, and wherein the none value level indicates that no level of authentication was performed on the payment card account and the cardholder during the provisioning of the generated token.

14. The authentication computer device of claim 9, wherein the one or more processors are further configured to:

determine, based on the AAV, that the payment requestor was authenticated through a separate authentication process initiated by the respective issuer.

15. The authentication computer device of claim 14, wherein generating the token for the respective payment card account based on the received AAV for the respective token request further comprises generating the token based on the determination that the payment requestor was authenticated through the separate authentication process initiated by the respective issuer.

16. A non-transitory computer-readable storage medium having computer-executable instructions embodied thereon, wherein when executed by an authentication computer device having at least one processor coupled to at least one memory device, the computer-executable instructions cause the at least one processor to:

receive, from a plurality of token requestors, a plurality of token requests, each token request including a payment card account identifier provided by a payment requestor to the respective token requestor, the payment card account identifier identifying a payment card account associated with a cardholder;

determine, for each token request, one of a plurality of types of identification and verification (IDV) required by a respective issuer of the payment card account in association with the provisioning of tokens, wherein the plurality of IDV types include a third-party validation and a network validation, wherein the third-party validation is associated with an assurance level that is a medium value level, and wherein the network validation is associated with the assurance level that is a low value level;

obtain, for each token request, an accountholder authentication value (AAV) from the respective issuer, comprising:

in response to determining that the required type of IDV for a first of the token requests is the third-party validation, (a) instructing the respective token requestor to initiate an IDV request, (b) receiving, from the respective token requestor in response to the IDV request, a plurality of authentication data, (c) calculating a network confidence score based on the authentication data, (d) transmitting the network confidence score to the respective issuer, and (e) receiving the AAV for the first token request from the respective issuer in response to the network confidence score; and in response to determining that the required type of IDV for a second of the token requests is the network validation, receiving, from the respective issuer, the AAV for the second token request from the respective issuer in response to validating that the respective payment card account is active and in good standing;

generate, for each token request, a token for the respective payment card account based on the received AAV for the respective token request;

associate, in the at least one memory device with each generated token, the corresponding payment card account identifier and the corresponding assurance level associated with the corresponding type of IDV;

in response to receiving, from a first merchant, a first authorization request including a first token generated in response to the first token request, retrieve, from the at least one memory device, the respective assurance level associated with the respective type of IDV and the respective payment card account identifier associated with the first token;

in response to receiving, from a second merchant, a second authorization request including a second token generated in response to the second token request, retrieve, from the at least one memory device, the respective assurance level associated with the respective type of IDV and the respective payment card account identifier associated with second token; and transmit, in response to the first and second authorization requests, the retrieved assurance levels associated with the corresponding types of IDV to the respective issuer, wherein the assurance level for the first token indicates a relatively higher assurance, as compared to the assurance level for the second token, that the first token was issued to a legitimate holder of the respective payment card account.

17. The computer-readable storage medium of claim 16, wherein the plurality of authentication data includes a high value level and the medium value level.

18. The computer-readable storage medium of claim 16, wherein the plurality of authentication data includes the low value level and a none value level.

19. The computer-readable storage medium of claim 16, wherein the computer-executable instructions further cause the at least one processor to:

determine, based on the AAV, that the payment requestor was authenticated through a separate authentication process initiated by the respective issuer.

\* \* \* \* \*